(12) United States Patent
Griffin et al.

(10) Patent No.: US 8,215,185 B2
(45) Date of Patent: Jul. 10, 2012

(54) VIBRATING FLOW DEVICE AND METHOD FOR FABRICATING A VIBRATING FLOW DEVICE

(75) Inventors: Clinton R. Griffin, Erie, CO (US); Michele Moore, Lafayette, CO (US); Anthony William Pankratz, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 111 days.

(21) Appl. No.: 12/746,574

(22) PCT Filed: Dec. 19, 2007

(86) PCT No.: PCT/US2007/088210
§ 371 (c)(1),
(2), (4) Date: Jun. 7, 2010

(87) PCT Pub. No.: WO2009/078880
PCT Pub. Date: Jun. 29, 2009

(65) Prior Publication Data
US 2010/0263456 A1 Oct. 21, 2010

(51) Int. Cl.
*G01F 1/84* (2006.01)

(52) U.S. Cl. ................................. 73/861.357
(58) Field of Classification Search ............. 73/861.357, 73/861.355, 861.356
See application file for complete search history.

(56) References Cited

U.S. PATENT DOCUMENTS
2007/0084298 A1  4/2007  Rieder et al.

FOREIGN PATENT DOCUMENTS
| WO | 0047957 A1 | 8/2000 |
| WO | 0133174 A1 | 5/2001 |
| WO | 0151898 A1 | 7/2001 |
| WO | 2005073676 A1 | 8/2005 |

*Primary Examiner* — Jewel V Thompson
(74) *Attorney, Agent, or Firm* — The Ollila Law Group LLC

(57) ABSTRACT

The present invention relates to a vibrating flow device that includes at least one conduit, at least one drive, at least one pick-off, and at least one housing. The at least one drive vibrates the at least one conduit at one or more drive frequencies and the at least one pick-off measures the motion of the at least one conduit. The at least one housing encompasses at least a portion of the at least one conduit. The at least one housing's modes of vibration occur at frequencies that exceed the one or more drive frequencies.

18 Claims, 8 Drawing Sheets

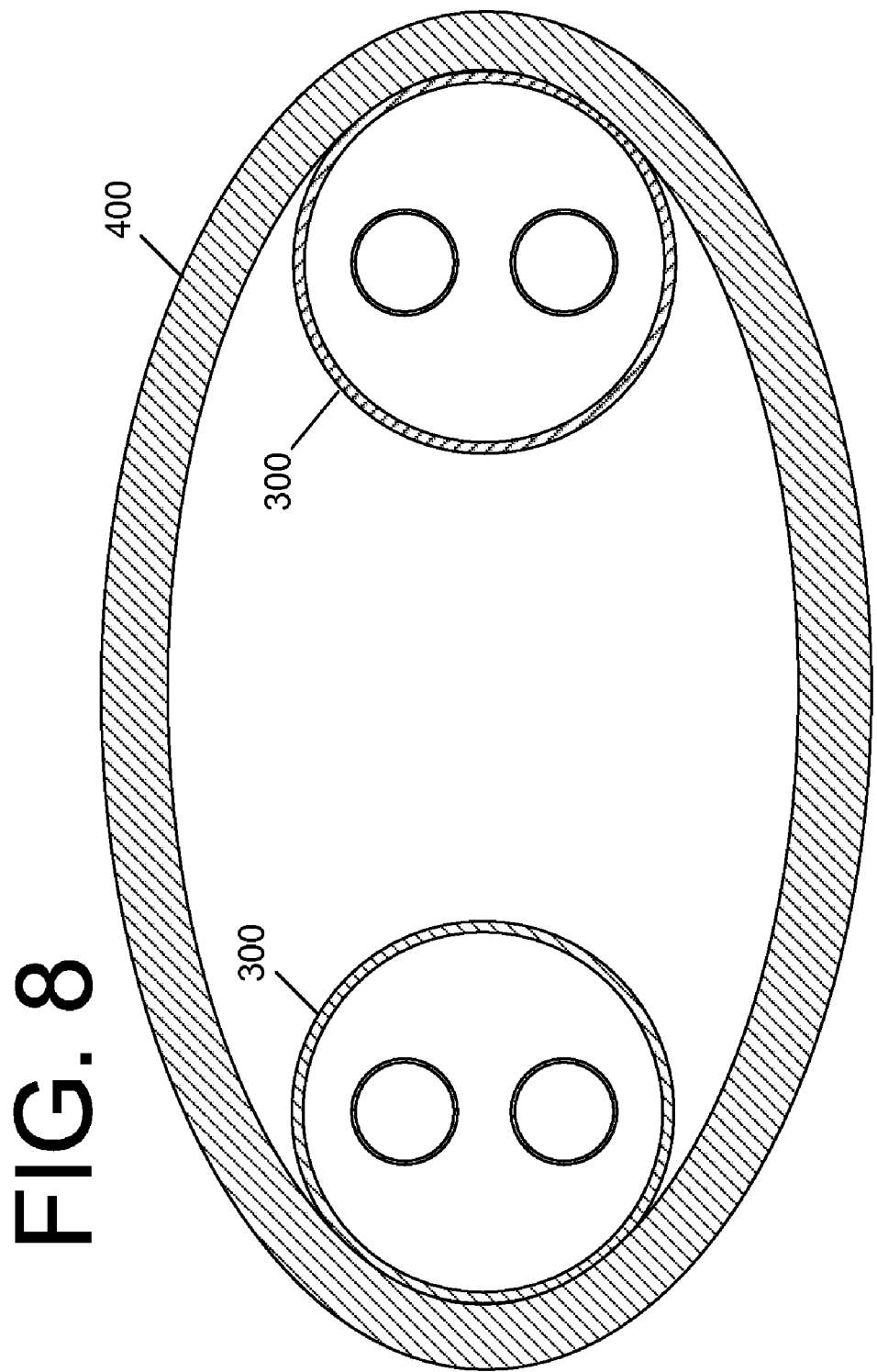

ated Mass flow, temperature,# VIBRATING FLOW DEVICE AND METHOD FOR FABRICATING A VIBRATING FLOW DEVICE

FIELD OF THE INVENTION

The present invention relates to a vibrating flow device having at least one housing, wherein the modes of vibration of the at least one housing occur at frequencies that exceed the drive frequency used to vibrate a conduit.

BACKGROUND OF THE INVENTION

Vibrating flow devices such as, for example, densitometers and Coriolis flow meters are used for measuring a characteristic of flowing substances, such as, for example, density, mass flow rate, volume flow rate, totalized mass flow, temperature, and other information. Vibrating flow devices include one or more conduits, which may have a variety of shapes, such as, for example, straight, U-shaped, or irregular configurations.

The one or more conduits have a set of natural vibration modes, including, for example, simple bending, torsional, radial, and coupled modes. The one or more conduits are vibrated by at least one drive at a resonance frequency (hereinafter referred to as the "drive frequency") in one of these modes, (hereinafter referred to as the "drive mode"), for purposes of determining a characteristic of the flowing substance. One or more electronics transmit a sinusoidal drive signal to the at least one drive, which is typically a magnet/coil combination with the magnet typically being affixed to the conduit and the coil being affixed to a supporting structure or to another conduit. The drive signal causes the drive to vibrate the one or more conduits at the drive frequency in the drive mode. For example, the drive signal may be a periodic electrical current transmitted to the coil.

At least one pick-off detects the motion of a conduit and generates a sinusoidal pick-off signal representative of the motion of the vibrating conduit(s). The pick-off signal is transmitted to the one or more electronics; and according to well known principals the pick-off signal may be used by the one or more electronics to determine a characteristic of the flowing substance or adjust the drive signal, if necessary.

Vibrating flow devices may also include a housing that typically encompasses the driver(s), the pick-off(s), and the conduit(s). Housings are typically used for a variety of reasons, including, for example, to provide a stable, known, or controlled operating environment, i.e. an environment free of moisture and harmful gases, or to protect the conduit(s) driver (s) or pick-off(s), i.e. from moisture, debris, or from damage due to contact with other objects or during shipment.

Housings also have one or more natural modes of vibration, including, for example, simple bending, torsional, radial, and lateral modes. In FIG. 4, for example, the bending mode would be about axis B and a lateral mode would be about axis A. As shown in FIG. 5, the particular frequency which induces a mode of vibration will vary. The frequency may vary according to a variety of factors including, for example, fluid density, as FIG. 5 shows, or environmental conditions, such as temperature. Vibrational forces generated by the driver and from other sources in the material processing system, such as pumps, may cause the housing to vibrate in one of the natural modes. Where the frequency used to drive the one or more conduits in the drive mode corresponds to the frequency that causes the housing to vibrate in one of its natural housing modes of vibration it becomes difficult to generate an accurate measurement of a characteristic of the flowing substance.

The present invention is directed to overcoming this disadvantage inherent in prior art housings.

SUMMARY OF THE INVENTION

The scope of the present invention is defined solely by the appended claims, and is not affected to any degree by the statements within this summary.

In one embodiment of the present invention, a vibrating flow device includes at least one conduit, at least one drive, at least one pick-off, and at least one housing. The at least one drive vibrates the at least one conduit at one or more drive frequencies and the at least one pick-off measures the motion of the at least one conduit. The at least one housing encompasses the at least one drive, the at least one pick-off, and at least a portion of the at least one conduit. The at least one housing's modes of vibration occur at frequencies that exceed the one or more drive frequencies.

In another embodiment of the present invention, a vibrating flow device includes at least one conduit, at least one drive, at least one pick-off, and at least one housing. The at least one drive vibrates the at least one conduit at one or more drive frequencies in a bending mode of vibration and the at least one pick-off measures the motion of the at least one conduit. The at least one housing encompasses at least a portion of the at least one conduit. The at least one housing's modes of vibration occur at frequencies that exceed the one or more drive frequencies. The at least one housing is provided with a cross-sectional length that extends in a direction that is generally parallel to the direction of motion of the bending mode and a cross-sectional width that extends in a direction that is generally orthogonal to the direction of motion of the bending mode, wherein the dimension of the cross-sectional length exceeds the dimension of the cross-sectional width.

In yet another embodiment of the present invention, a method for fabricating a vibrating flow device, includes the steps of providing at least one conduit, at least one drive, at least one pick-off, and at least one housing. The at least one drive is configured to vibrate the at least one conduit at one or more drive frequencies and the at least one pick-off is configured to measure the motion of the at least one conduit. The at least one housing is configured to encompass at least a portion of the at least one conduit. The at least one housing is configured so that the at least one housing's modes of vibration occur at frequencies that exceed the one or more drive frequencies.

Aspects

According to one aspect of the present invention, a vibrating flow device comprises:

at least one conduit, at least one drive, and at least one pick-off, wherein the at least one drive vibrates the at least one conduit at one or more drive frequencies and the at least one pick-off measures the motion of the at least one conduit; and at least one housing that encompasses the at least one drive, the at least one pick-off, and at least a portion of the at least one conduit, wherein the at least one housing's modes of vibration occur at frequencies that exceed the one or more drive frequencies.

Preferably, the at least one drive vibrates the at least one conduit in a bending mode of vibration.

Preferably, the at least one housing is provided with a generally U-shape.

Preferably, the one or more drive frequencies vibrate the at least one conduit in a bending mode of vibration and the at least one housing is provided with a cross-sectional length that extends in a direction that is generally parallel to the direction of motion of the bending mode and a cross-sectional width that extends in a direction that is generally orthogonal to the direction of motion of the bending mode, wherein the dimension of the cross-sectional length exceeds the dimension of the cross-sectional width.

Preferably, a stiffening member is affixed to the at least one housing to increase the stiffness of the at least one housing.

Preferably, the vibrating flow device is a Coriolis flowmeter.

Preferably, the vibrating flow device is a densitometer.

According to another aspect of the present invention, a vibrating flow device comprises:

at least one conduit, at least one drive, and at least one pick-off, wherein the at least one drive vibrates the at least one conduit at one or more drive frequencies in a bending mode of vibration and the at least one pick-off measures the motion of the at least one conduit;

at least one housing that encompasses at least a portion of the at least one conduit, wherein the at least one housing's modes of vibration occur at frequencies that exceed the one or more drive frequencies; and the at least one housing is provided with a cross-sectional length that extends in a direction that is generally parallel to the direction of motion of the bending mode and a cross-sectional width that extends in a direction that is generally orthogonal to the direction of motion of the bending mode, wherein the dimension of the cross-sectional length exceeds the dimension of the cross-sectional width.

Preferably, the at least one housing is provided with a generally U-shape.

Preferably, the vibrating flow device is a Coriolis flowmeter.

Preferably, the vibrating flow device is a densitometer.

According to another aspect of the present invention, a method for fabricating a vibrating flow device comprises the steps of:

providing at least one conduit, at least one drive, and at least one pick-off, wherein the at least one drive is configured to vibrate the at least one conduit at one or more drive frequencies and the at least one pick-off is configured to measure the motion of the at least one conduit;

providing at least one housing that is configured to encompass at least a portion of the at least one conduit, wherein the at least one housing is configured so that the at least one housing's modes of vibration occur at frequencies that exceed the one or more drive frequencies.

Preferably, the at least one drive is configured to vibrate the at least one conduit in a bending mode of vibration.

Preferably, the at least one housing is provided with a generally U-shape.

Preferably, the at least one drive is configured to vibrate the at least one conduit in a bending mode of vibration and the at least one housing is provided with a cross-sectional length that extends in a direction that is generally parallel to the direction of motion of the bending mode and a cross-sectional width that extends in a direction that is generally orthogonal to the direction of motion of the bending mode, wherein the dimension of the cross-sectional length exceeds the dimension of the cross-sectional width.

Preferably, a stiffening member is affixed to the at least one housing to increase the stiffness of the housing.

Preferably, the vibrating flow device is a Coriolis flowmeter.

Preferably, the vibrating flow device is a densitometer.

BRIEF DESCRIPTION OF THE DRAWINGS

FIG. 8 depicts a housing attached to a stiffening member that increases the stiffness of the housing.

DETAILED DESCRIPTION OF THE PRESENTLY PREFERRED EMBODIMENT

Figure 1:
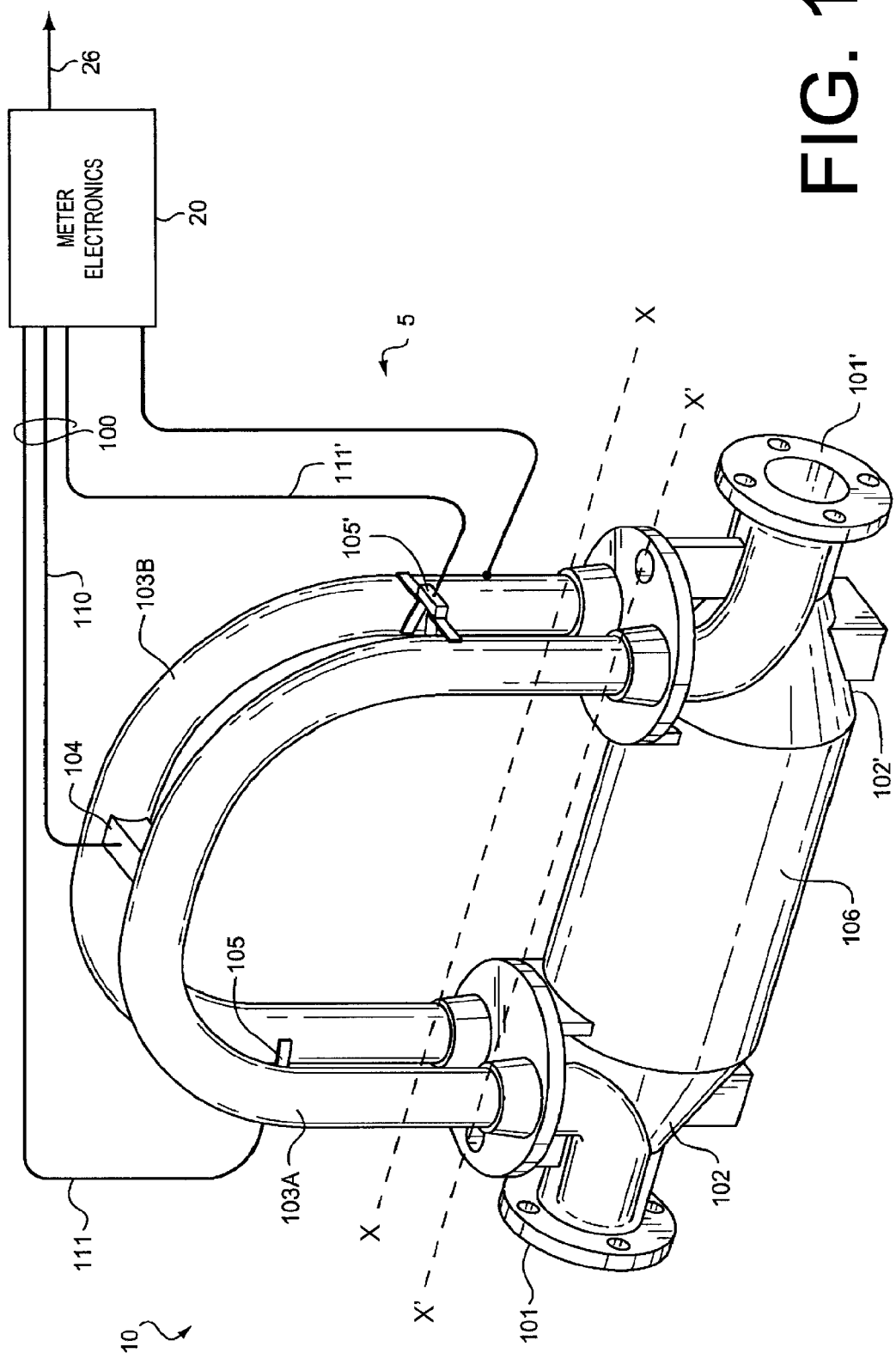
FIG. 1 depicts a perspective view of a vibrating flow device according to one embodiment of the present invention.

FIG. 1 illustrates an example of a vibrating flow device 5 in the form of a Coriolis flow meter comprising a sensor assembly 10 and one or more electronics 20. The one or more electronics 20 are connected to sensor assembly 10 via leads 100 to measure a characteristic of a flowing substance, such as, for example, density, mass flow rate, volume flow rate, totalized mass flow, temperature, and other information over path 26.

The sensor assembly 10 of the present example includes a pair of flanges 101 and 101'; manifolds 102 and 102'; driver 104; pick-offs 105-105'; and conduits 103A and 103B. Manifolds 102, 102' are affixed to opposing ends of the conduits 103A, 103B. Driver 104 and pick-offs 105 and 105' are connected to conduits 103A and 103B. The driver 104 is affixed to conduits 103A, 103B in a position where the driver 104 can vibrate the conduits 103A, 103B in a drive mode. Pick-offs are affixed to conduits 103A, 103B at opposing ends to detect motion of the conduits 103A, 103B. It should be apparent to those skilled in the art that it is within the scope of the present invention to use the principals discussed herein in conjunction with any type of vibrating flow device, including, for example, densitometers, regardless of the number of conduits, the number of drivers, the number of pick-offs, the operating mode of vibration or the determined characteristic of the flowing substance.

Flanges 101 and 101' of the present example are affixed to manifolds 102 and 102'. Manifolds 102 and 102' of the present example are affixed to opposite ends of spacer 106. Spacer 106 maintains the spacing between manifolds 102 and 102' in the present example to prevent undesired vibrations in conduits 103A and 103B. When sensor assembly 10 is inserted into a pipeline system (not shown) which carries the flowing substance, the substance enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through flange 101'.

In the present example, the drive mode may be, for example, the first out of phase bending mode and the conduits 103A and 103B may be selected and appropriately mounted to inlet manifold 102 and outlet manifold 102' so as to have substantially the same mass distribution, moments of inertia, and elastic modules about bending axes X and X', respectively. As shown, the conduits extend outwardly from the manifolds in an essentially parallel fashion. Although the conduits 103A, 103B are shown provided with a generally U-shape, it is within the scope of the present invention to provide the conduits 103A, 103B with other shapes, such as, for example, straight or irregular shapes. Furthermore, it is within the scope of the present invention to utilize modes other than the out of phase bending mode as the drive mode.

In the present example, wherein the drive mode may be the first out of phase bending mode, the conduits 103A-B may be driven by driver 104 in opposite directions about their respective bending axes X and X'. Driver 104 may comprise one of many well known arrangements, such as a magnet mounted to conduit 103A and an opposing coil mounted to conduit 103B. An alternating current is passed through the opposing coil to cause both conduits 103A, 103B to oscillate. A suitable drive signal is applied by one or more electronics 20, via lead 110 to driver 104. Although in the present example, the drive mode is described as being the bending mode, it is within the scope of the present invention to utilize other drive modes.

In the present example, the one or more electronics 20 produces a drive signal and transmits it to the driver 104 via lead 110, which causes driver 104 to oscillate conduits 103A and 103B. It is within the scope of the present invention to produce multiple drive signals for multiple drivers, however. One or more electronics 20 processes left and right velocity signals from pick-offs 105, 105' to compute a characteristic of a flowing substance, such as, for example, mass flow rate. Path 26 provides an input and an output means that allows one or more electronics 20 to interface with an operator. An explanation of the circuitry of one or more electronics 20 is not needed to understand the present invention and is omitted for brevity of this description. The description of FIG. 1 is provided merely as an example of the operation of one possible vibrating flow device and is not intended to limit the teaching of the present invention.

Figure 2:
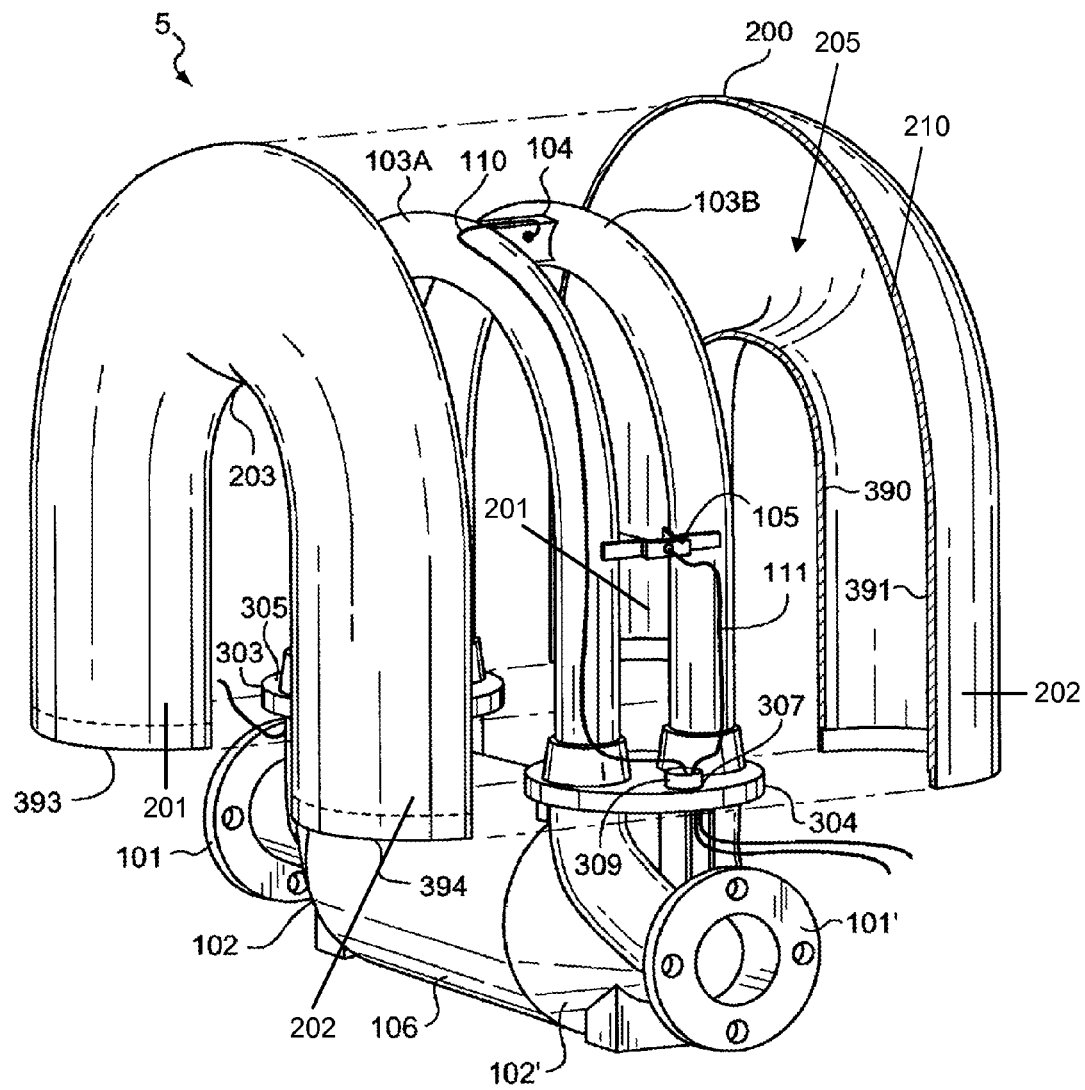
FIG. 2 depicts a perspective view of a vibrating flow device provided with a housing, which is shown in section, according to one embodiment of the present invention.
Figure 3:
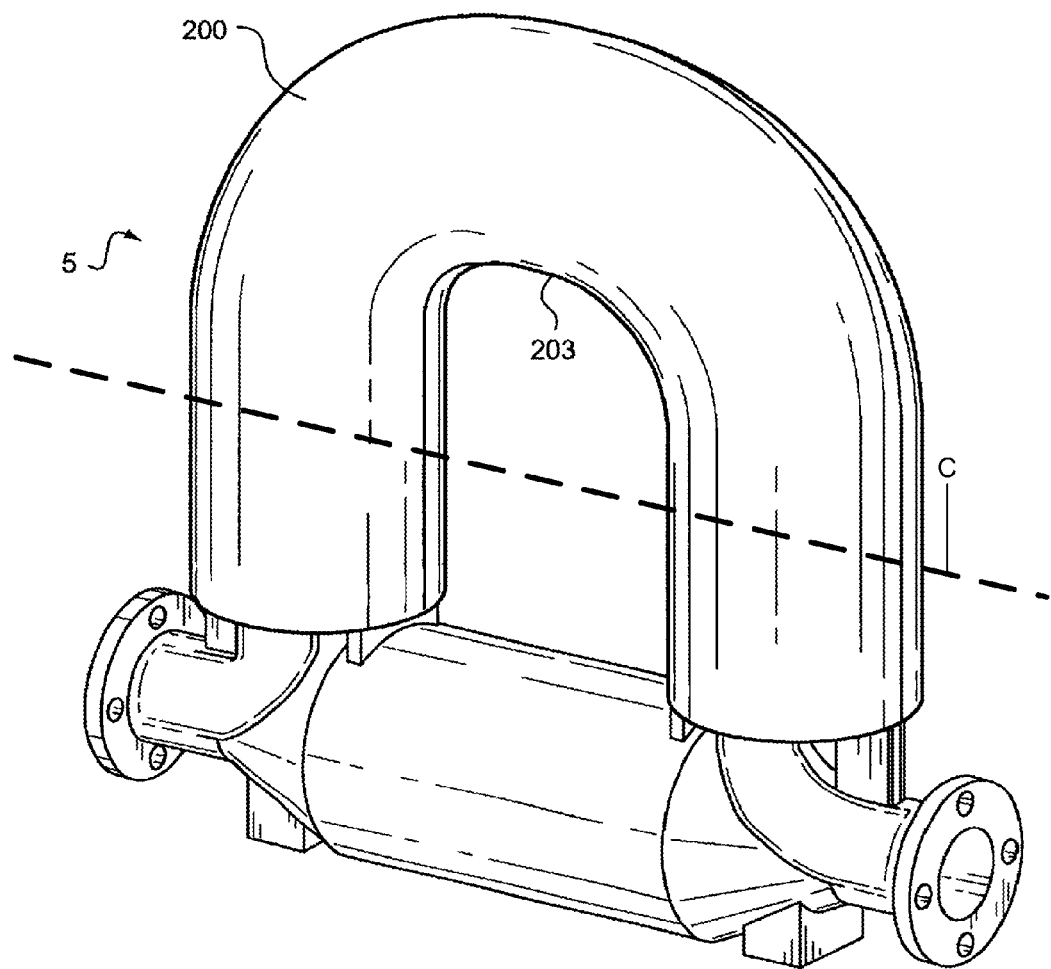
FIG. 3 depicts a perspective view of a vibrating flow device provided with a housing according to one embodiment of the present invention.

FIGS. 2 and 3 illustrate a housing 200 according to an embodiment of the present invention. According to one aspect of the present embodiment, the housing 200 encompasses the conduits 103A, 103B, the driver 104, and the pick-offs 105, 105'. Those skilled in the art will appreciate that the wall 210 of the housing may define one or more openings (not shown) for purposes of connecting at least one pick-off, such as pick-offs 105-105', and at least one driver, such as driver 104, to the one or more electronics 20, such as, for example, via leads 100, 110, 111, 111', which may be RTD wires.

As shown, the housing 200 is provided with a first end 201 and a second end 202. In the exemplary embodiment, the first end 201 is secured to a plate 303 that is affixed to manifold 102 on the inlet side of the vibrating flow device 5 and the second end 202 is secured to a plate 304 that is affixed to manifold 102'. Those skilled in the art will recognize that although one possible specific design for a housing 200 is described, there are various methods that can be employed to enclose the conduits 103A, 103B. For example, one skilled in the art will recognize that it is within the scope of the present invention for the housing 200 to be secured to locations on the vibrating flow device 5 other than or in addition to the plates 303, 304. Furthermore, while in the embodiment depicted the plate 303 and plate 304 are provided integrally on the manifolds 102 and 102', the plates 303, 304 may also be affixed to manifolds 102 and 102' by welds or other methods. Moreover, although the housing 200 is shown with a generally U-shape, it is within the scope of the present invention to provide the housing with other configurations, such as, for example, straight or irregular configurations.

Figure 4:
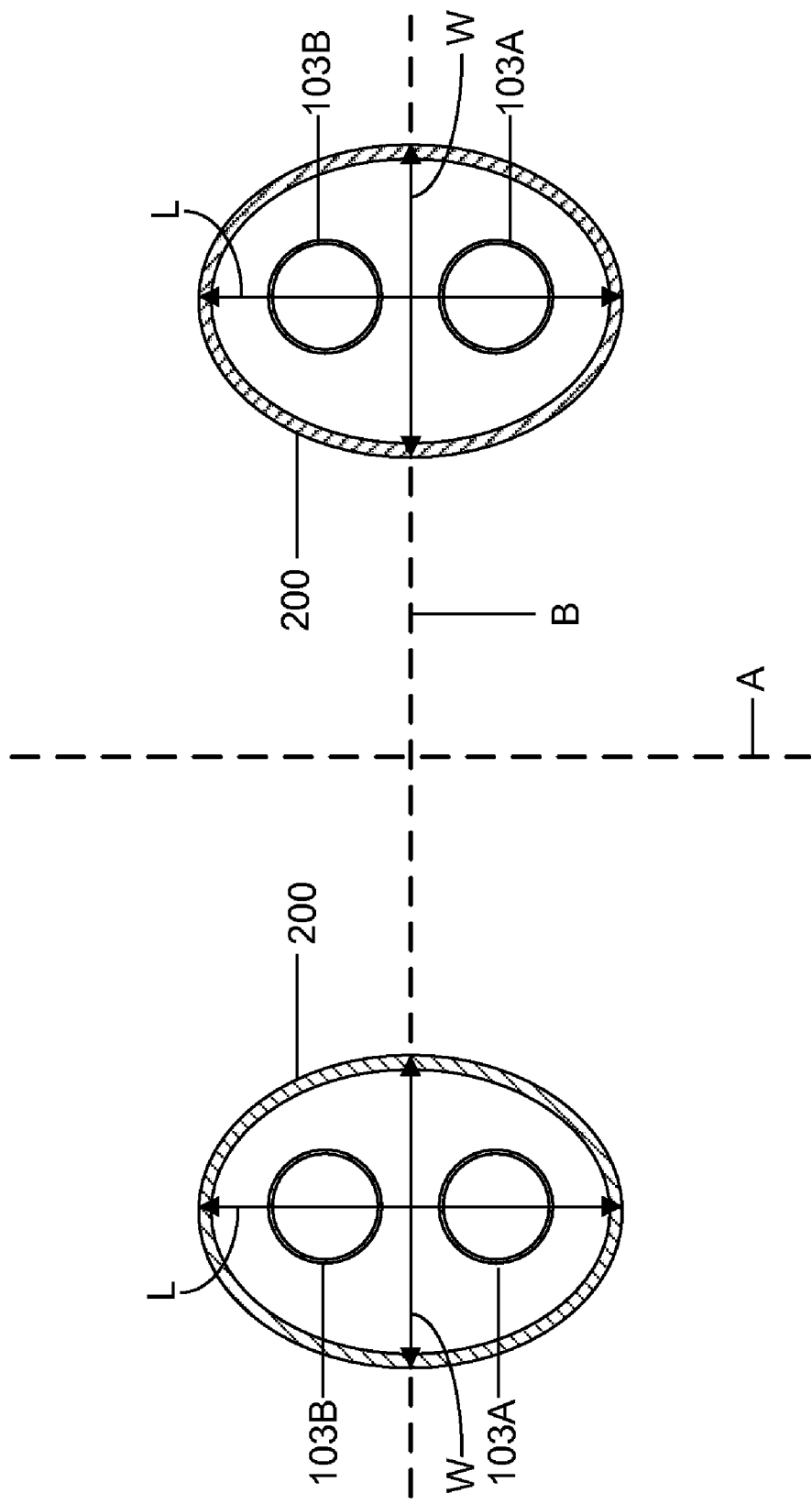
FIG. 4 depicts a sectional view, taken along line C of FIG. 3, of a housing and conduits according to one embodiment of the present invention.

Turning now to FIG. 4, housings, such as housing 200, of vibrating flow devices, such as vibrating flow device 5, have a plurality of vibrational modes, including, for example, and not limited to, a lateral mode of vibration about axis A and a bending mode of vibration about axis B. In the exemplary embodiment depicted, the axis B is generally parallel to the axes X and X' (shown in FIG. 1) about which the conduits 103A and 103B oscillate and the axis A is generally orthogonal to the axes X, X', and B.

Figure 5:
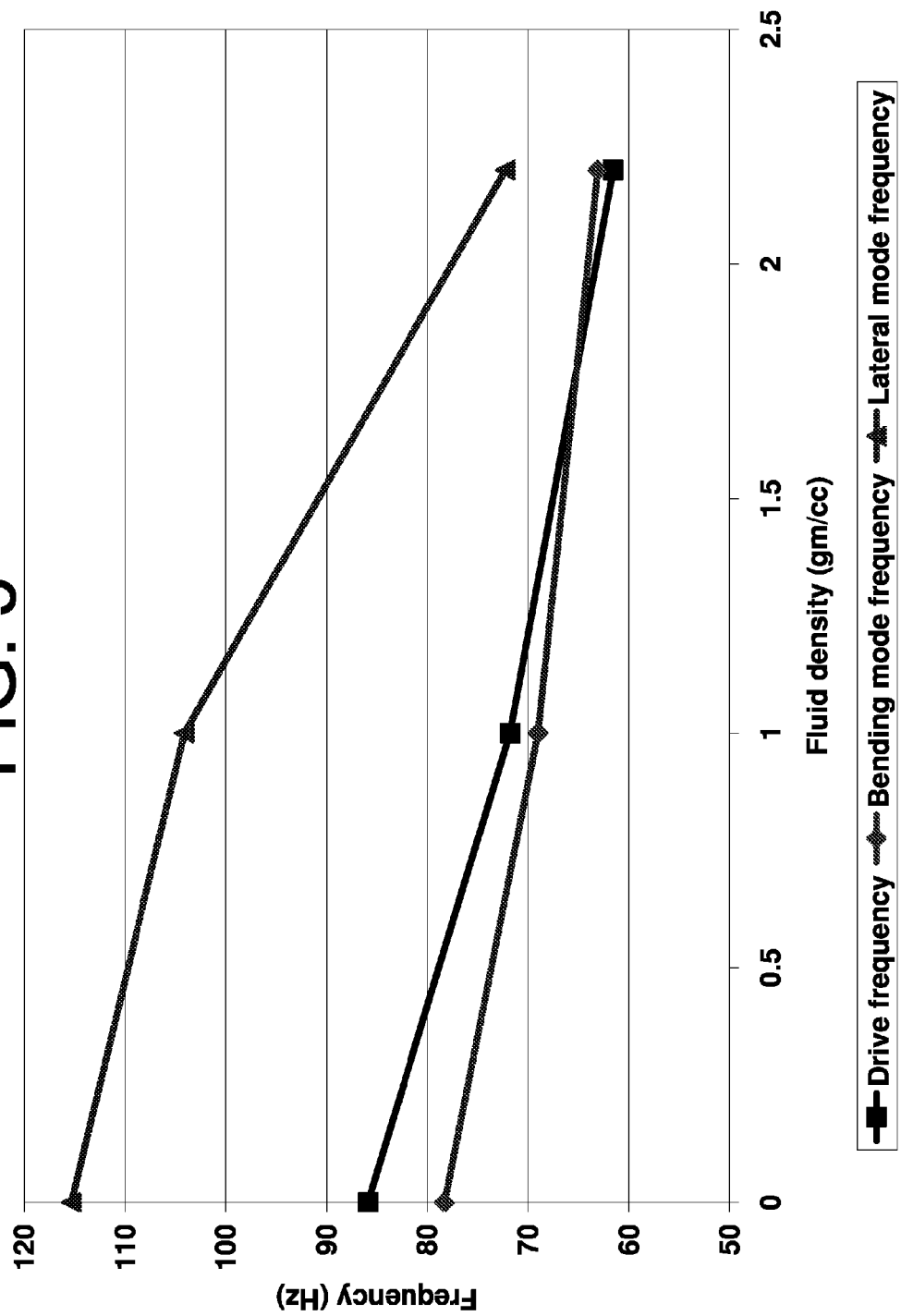
FIG. 5 depicts a graph showing a relationship between fluid density and the frequencies which induces a drive mode of vibration in at least one conduit and the frequencies which induce modes of vibration in a housing.

Each vibrational mode of the housing 200 is generated by a range of frequencies. The particular frequencies that induce any particular mode are influenced by a number of factors, such as, for example, fluid density, environmental factors, such as temperature, or insulating wraps that may be located around the housing 200. FIG. 5 shows, that in previous housings certain housing vibration modes occur, under certain conditions, at frequencies that are substantially identical to the drive frequencies that induce a drive mode in the conduits 103A, 103B. As FIG. 5 also shows, housings are typically provided with one or more other modes that occur at frequencies that are greater than the drive frequencies that induce the drive mode. Where the frequency that induces a mode of vibration in the housing is substantially identical to the drive frequency that induces the drive mode it is difficult to generate an accurate measurement of a characteristic of the flowing substance.

According to one aspect of the present embodiment, the housing 200 of the present embodiment is configured so that there is frequency separation between the frequencies that induce the modes of vibration in the housing 200 and the drive frequencies that induce the drive mode of vibration in the conduits 103A, 103B. According to another aspect of the present embodiment, the housing 200 is configured so that the frequencies that induce the modes of vibration in the housing 200 differ from and do not cross the drive frequencies that induce the drive mode of vibration in the conduits 103A, 103B under corresponding operating conditions. According to yet another aspect of the present embodiment, the housing 200 is configured so that the frequencies that induce the modes of vibration in the housing 200 exceed the drive frequencies that induce the drive mode of vibration in the conduits 103A, 103B.

Figure 6:
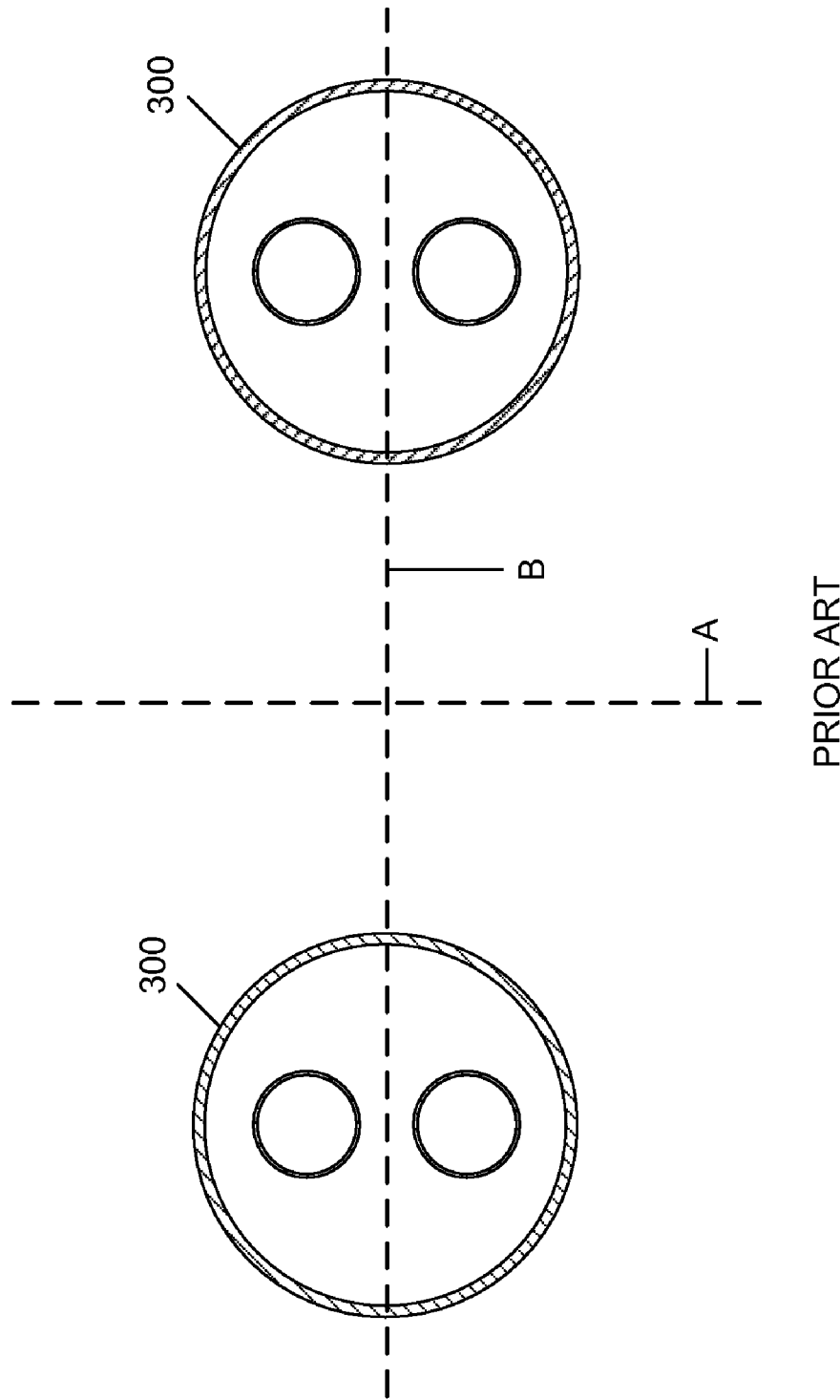
FIG. 6 depicts a typical housing of the prior art.

Turning now to FIG. 6, a typical housing, such as housing 300, has a generally annular cross-sectional shape; and, in the case where the drive mode is the bending mode, the housing has a moment of inertia in the direction of the motion of the bending mode, i.e., a direction that is generally orthogonal to the axis, such as axis B, that is relatively low.

In such a design, as shown in FIG. 5, however, the frequencies that induce the housing bending mode may cross the drive frequencies that induce the bending drive mode under certain conditions.

The frequency which generates a mode of vibration in housings is related to the moment of inertia of the housing. More particularly, the frequency at which a mode of vibration occurs may be modeled based upon the following equation or a variation of the following equation.

$$f_i = \frac{\lambda_i^2}{2\pi}\sqrt{\frac{EI}{\rho A}}$$

Figure 7:
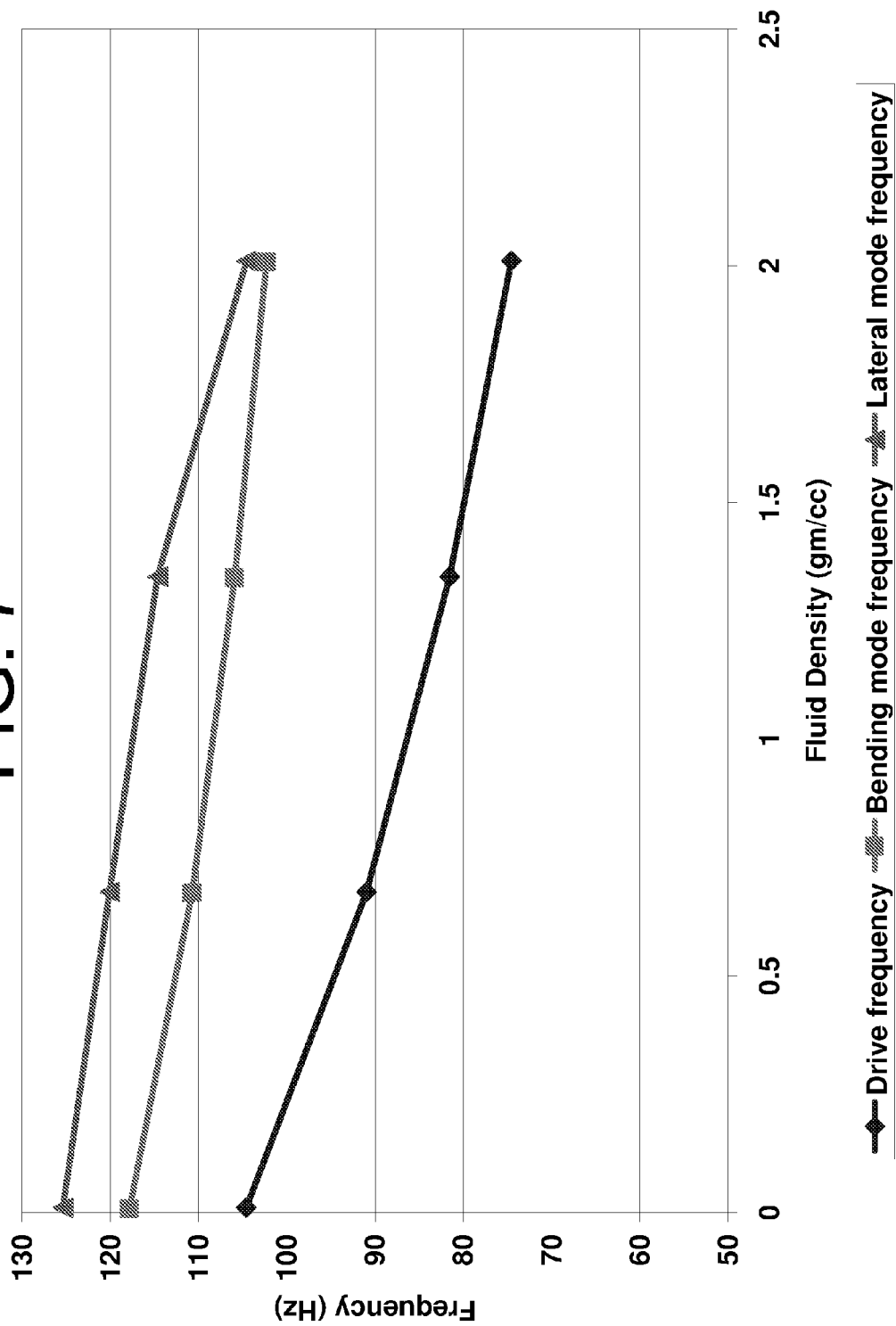
FIG. 7 depicts a graph showing a relationship between fluid density and the frequencies that induce a drive mode of vibration in at least one conduit and the frequencies that induce modes of vibration in a housing according to an embodiment of the present invention.

Where:
$f_i$=Natural Frequency that generates the mode
I=Moment of Inertia in the direction of the mode
E=Modulus of Elasticity
$\rho$=Density of Material
A=Beam cross sectional area
I=Mode Number
$\lambda_i$=Eigen values Although the foregoing equation models the natural frequencies for a cantilevered beam, it is useful to show that there is a relationship between the moment of inertia and the natural frequencies that generate a particular mode of vibration. More particularly, the foregoing equation teaches that as the moment of inertia is increased, the frequency that induces any particular mode of vibration is increased. Therefore, according to one aspect of the present embodiment, this principal may be used so that the housing's 200 modes of vibration occur at frequencies that exceed the one or more drive frequencies. For example, and not limitation, in the present embodiment where the bending mode is the drive mode and the frequencies of the housing bending mode tend to cross the drive frequencies under certain conditions, the housing 200 may be provided with a cross-sectional shape that is generally oblong. More particularly, as shown in FIG. 4, where the bending mode is the drive mode, the housing 200 may be provided with a cross-sectional shape that is generally oblong and provided with a width W and a length L that measures greater than the width W, wherein the length L extends in the direction of motion of the bending mode and the width W is generally orthogonal to the direction of the bending mode. By following such an approach, the moment of inertia of the housing 200 is increased and, as shown in FIG. 7, the frequencies that induce the modes of vibration in the housing exceed the frequencies that induce the drive mode.

While in the previous example, the bending housing mode of vibration tends to be problematic, the particular mode or modes of vibration that tend to cross with the drive mode will depend on a number of factors, such as, for example, the shape of the conduit(s), the shape of the housing, the particular drive mode, the fluid density, and temperature. Accordingly, the particular housing configuration that may be used to avoid frequency crossing will vary within the scope of the present invention. For example, although, the present embodiment depicts the housing 200 provided with an oblong shape, it is within the scope of the present invention to utilize other arrangements that prevent frequency crossing. By way of example, the thickness or cross-sectional shape of the wall 210 may be selected so that the frequencies that generate the any particular mode in the housing 200 exceed the frequencies that generate the drive mode under corresponding operating conditions. By way of yet another example, particularly where the twist mode is the drive mode and the frequencies that induce the twist mode in the housing may tend to cross with the drive frequencies, as shown in FIG. 8, a stiffening member 400 may be affixed, such as by welding, to a housing 300. The stiffening member 400 may be provided with any shape that stiffens a housing 300, including, for example, but not limitation, the oblong annular shape shown in FIG. 8.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:
1. A vibrating flow device (5), comprising:
at least one conduit (103A, 103B), at least one drive (104), and at least one pick-off (105, 105'), wherein the at least one drive (104) vibrates the at least one conduit (103A, 103B) at one or more drive frequencies and the at least one pick-off (105, 105') measures the motion of the at least one conduit; and
at least one housing (200) that encompasses the at least one drive (104), the at least one pick-off (105, 105'), and at least a portion of the at least one conduit (103A,103B), wherein the at least one housing's (200) modes of vibration occur at frequencies that exceed the one or more drive frequencies.

2. The vibrating flow device (5) according to claim 1, wherein the at least one drive (104) vibrates the at least one conduit (103A, 103B) in a bending mode of vibration.

3. The vibrating flow device (5) according to claim 1, wherein the at least one housing (200) is provided with a generally U-shape.

4. The vibrating flow device (5) according to claim 1, wherein:
the one or more drive frequencies vibrate the at least one conduit (103A, 103B) in a bending mode of vibration and the at least one housing (200) is provided with a cross-sectional length (L) that extends in a direction that is generally parallel to the direction of motion of the bending mode and a cross-sectional width (W) that extends in a direction that is generally orthogonal to the direction of motion of the bending mode, wherein the dimension of the cross-sectional length (L) exceeds the dimension of the cross-sectional width (W).

5. The vibrating flow device (5) according to claim 1, wherein a stiffening member (400) affixed to the at least one housing (200) to increase the stiffness of the housing (200).

6. The vibrating flow device (5) according to claim 1, wherein the vibrating flow device (5) is a Coriolis flowmeter.

7. The vibrating flow device (5) according to claim 1, wherein the vibrating flow device (5) is a densitometer.

8. A vibrating flow device (5), comprising:
at least one conduit (103A, 103B) at least one drive (104), and at least one pick-off (105, 105'), wherein the at least one drive (104) vibrates the at least one conduit (103A, 103B) at one or more drive frequencies in a bending mode of vibration and the at least one pick-off (105, 105') measures the motion of the at least one conduit (103A, 103B);

at least one housing (200) that encompasses at least a portion of the at least one conduit (103A, 103B), wherein the at least one housing's (200) modes of vibration occur at frequencies that exceed the one or more drive frequencies; and the at least one housing (200) is provided with a cross-sectional length (L) that extends in a direction that is generally parallel to the direction of motion of the bending mode and a cross-sectional width (W) that extends in a direction that is generally orthogonal to the direction of motion of the bending mode, wherein the dimension of the cross-sectional length (L) exceeds the dimension of the cross-sectional width (W).

9. The vibrating flow device (5) according to claim 8, wherein the at least one housing (200) is provided with a generally U-shape.

10. The vibrating flow device (5) according to claim 8, wherein the vibrating flow device (5) is a Coriolis flowmeter.

11. The vibrating flow device (5) according to claim 8, wherein the vibrating flow device (5) is a densitometer.

12. A method for fabricating a vibrating flow device (5), comprising the steps of:

providing at least one conduit (103A, 103B), at least one drive (104), and at least one pick-off (105, 105'), wherein the at least one drive (104) is configured to vibrate the at least one conduit (103A, 103B) at one or more drive frequencies and the at least one pick-off (105, 105') is configured to measure the motion of the at least one conduit (103A, 103B);

providing at least one housing (200) that is configured to encompass at least a portion of the at least one conduit (103A, 103B), wherein the housing (200) is configured so that the at least one housing's (200) modes of vibration occur at frequencies that exceed the one or more drive frequencies.

13. The method for fabricating the vibrating flow device (5) according to claim 12, wherein the at least one drive (104) is configured to vibrate the at least one conduit (103A, 103B) in a bending mode of vibration.

14. The method for fabricating the vibrating flow device (5) according to claim 12, wherein the at least one housing (200) is provided with a generally U-shape.

15. The method for fabricating the vibrating flow device (5) according to claim 12, wherein:

the at least one drive (104) is configured to vibrate the at least one conduit (103A, 103B) in a bending mode of vibration and the at least one housing (200) is provided with a cross-sectional length (L) that extends in a direction that is generally parallel to the direction of motion of the bending mode and a cross-sectional width (W) that extends in a direction that is generally orthogonal to the direction of motion of the bending mode, wherein the dimension of the cross-sectional length (L) exceeds the dimension of the cross-sectional width (W).

16. The method for fabricating the vibrating flow device (5) according to claim 12, wherein a stiffening member (400) is affixed to the least one housing (200) to increase the stiffness of the at least one housing (200).

17. The method for fabricating the vibrating flow device (5) according to claim 12, wherein the vibrating flow device (5) is a Coriolis flowmeter.

18. The method for fabricating the vibrating flow device (5) according to claim 12, wherein the vibrating flow device (5) is a densitometer.

* * * * *